United States Patent
Giua et al.

(10) Patent No.: US 9,603,481 B2
(45) Date of Patent: Mar. 28, 2017

(54) APPARATUS AND SYSTEM FOR THE PREPARATION OF BEVERAGES, IN PARTICULAR MILK-BASED BEVERAGES, SUCH AS CAPPUCCINO, CHOCOLATE AND THE LIKE

(75) Inventors: Alberto Federico Giua, Gallarate (IT); Danilo Icardi, Turin (IT); Sergio Icardi, legal representative, Turin (IT); Maria Teresa Giaretto, legal representative, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 989 days.

(21) Appl. No.: 13/885,370

(22) PCT Filed: Nov. 22, 2011

(86) PCT No.: PCT/IB2011/055235
§ 371 (c)(1),
(2), (4) Date: May 14, 2013

(87) PCT Pub. No.: WO2012/069991
PCT Pub. Date: May 31, 2012

(65) Prior Publication Data
US 2013/0239819 A1  Sep. 19, 2013

(30) Foreign Application Priority Data
Nov. 23, 2010  (IT) ............... TO2010A0928

(51) Int. Cl.
*A47J 31/44*  (2006.01)
*A47J 43/07*  (2006.01)

(52) U.S. Cl.
CPC ....... *A47J 31/4403* (2013.01); *A47J 31/4489* (2013.01); *A47J 43/0705* (2013.01)

(58) Field of Classification Search
CPC ............... A47J 31/4403; A47J 31/4407; A47J 31/4489; A47J 31/4496; A47J 31/46;
(Continued)

(56) References Cited

U.S. PATENT DOCUMENTS

| | | | |
|---|---|---|---|
| 2007/0221068 A1* | 9/2007 | Boussemart | A47J 27/004 99/279 |
| 2008/0008806 A1* | 1/2008 | Boussemart | A47J 43/042 426/519 |
| 2012/0000372 A1* | 1/2012 | Vanni | A47J 31/4489 99/323.1 |

FOREIGN PATENT DOCUMENTS

| CH | DE 19645564 A1 * | 5/1998 | ............ A47J 27/004 |
|---|---|---|---|
| DE | 196 45 564 A1 | 5/1998 | |

(Continued)

OTHER PUBLICATIONS

Translation for Strub et al. (DE19645564A1) included.*

*Primary Examiner* — Dana Ross
*Assistant Examiner* — Brandon Harvey
(74) *Attorney, Agent, or Firm* — Sughrue Mion, PLLC

(57) ABSTRACT

An apparatus including a container (2); a removable cover (3); a rotating stirrer (6) which extends inside the container (2) and is provided with an end impeller (8); an electric motor (22), for driving the stirrer (6) via a coupling joint (9, 10, 23, 26); and a hot steam dispensing wand (13) extending inside the container (2) and connectable to the steam source (52) of a coffee machine (CM) via a connection union (12) associated with the cover (3). The electric motor (22) is contained in a housing (21) which is separate and distinct from the cover (3) and is connected or able to be connected to power supply terminals (49, 50) with which the coffee machine (CM) is provided. The cover (3) supports the stirrer (Continued)

(6) rotatably and the inlet fluid connector (12) thereof is directly connected to a steam dispensing fluid union (48) of the coffee machine (CM).

6 Claims, 10 Drawing Sheets

(58) Field of Classification Search
 CPC ........ A47J 31/462; A47J 31/465; A47J 43/07; A47J 43/0705; A01K 7/027; H05B 3/06; H05B 3/78; H05B 3/80
 USPC ........... 99/279, 285, 287, 291, 293; 392/448
 See application file for complete search history.

(56) References Cited

FOREIGN PATENT DOCUMENTS

| | | |
|---|---|---|
| EP | 2 198 762 A1 | 6/2010 |
| WO | 2005/089572 A1 | 9/2005 |
| WO | 2010/023313 A1 | 3/2010 |

\* cited by examiner

APPARATUS AND SYSTEM FOR THE PREPARATION OF BEVERAGES, IN PARTICULAR MILK-BASED BEVERAGES, SUCH AS CAPPUCCINO, CHOCOLATE AND THE LIKE

This is a National Stage Entry of Application No. PCT/IB2011/055235 filed Nov. 22, 2011, claiming priority based on Italian Patent Application No. TO2010A000928 filed Nov. 23, 2010, the contents of all of which are incorporated herein by reference in their entirety.

The present invention relates to an apparatus for the preparation of hot beverages, in particular milk-based beverages, such as cappuccino, chocolate and the like.

The apparatus is intended to be manufactured, in particular, in the form of an accessory which can be connected to a coffee machine of the conventional type, having a hot steam source.

More specifically the invention relates to an apparatus of the type comprising
- a container,
- a removable cover, suitable for closing the container,
- a stirrer which extends inside the container and is provided with an end impeller,
- an electric motor, capable of driving the stirrer rotationally via a coupling joint, and
- a hot steam dispensing wand, also extending inside the container and connectable to the steam source of said machine via a fluid connection union associated with the cover.

An apparatus of this type is described and illustrated in European patent application EP 2 198 762 A1 in the name of the same Applicant.

In this known apparatus the electric motor driving the stirrer is mounted inside the cover of the container and can be connected to a power socket of the power supply network of a building via a special electric cable. The stirrer can be engaged, detachably, with one end of a joint, the other end of which can be engaged on the shaft of the motor. The hot steam supply wand of the known apparatus is connectable to a steam socket of a coffee machine via a special flexible hose, one end of which must be engaged on the fluid inlet union of the cover and the other end of which is coupled to the aforementioned steam socket of the coffee machine.

The known apparatus described above has a number of drawbacks.

Firstly its use requires that a certain number of interconnection operations be performed: the electric motor driving the stirrer must be connected to a power socket of the local power supply network and the steam inlet fluid union of the cover must be connected via a flexible pipe to a steam supply socket of a coffee machine.

After use it is required to perform corresponding electrical/fluid disconnection operations and then proceed to wash both the container and the cover as well as said flexible pipe.

Washing of the cover may result in the risk of water penetrating inside the chamber of the cover where the electric motor driving the stirrer is housed, with the consequent risk of leakages and possible short-circuiting.

One object of the present invention is to provide an apparatus which is able to overcome the abovementioned drawbacks of the apparatus according to the prior art.

This object, together with other objects, is achieved with an apparatus of the type initially defined, characterized in that:
- the electric motor is contained in a housing which is separate and distinct from the cover and is connected or able to be connected to electric supply terminals of the coffee machine with which the apparatus is associated;
- the cover is designed to support the stirrer rotatably and the inlet fluid connector thereof is able to be directly coupled to a steam dispensing fluid union or socket of the coffee machine;
- the aforementioned coupling joint comprises first and second coupling means which are separate and distinct from each other and connected to the shaft of the motor and to the end of the stirrer opposite the impeller and close to the cover, respectively;
- the motor housing and the cover being able to be coupled together in an operating configuration in which said first and second coupling means allow transmission of the rotation from the motor to the stirrer and in which the fluid inlet union of the cover can be directly connected to a steam dispensing socket of the machine.

Owing to these characteristic features, as will appear more clearly below, the apparatus according to the invention requires a small number of connection/disconnection operations before/after use. Moreover, after use it is sufficient to perform washing of the container and the associated cover.

Use of the apparatus according to the present invention is therefore much easier and much safer.

The invention also relates to a system for the preparation of beverages, comprising a coffee machine and an apparatus of the type defined above.

Further characteristic features and advantages of the invention will become clear from the following detailed description provided purely by way of a non-limiting example, with reference to the accompanying drawings in which.

Figure 1:
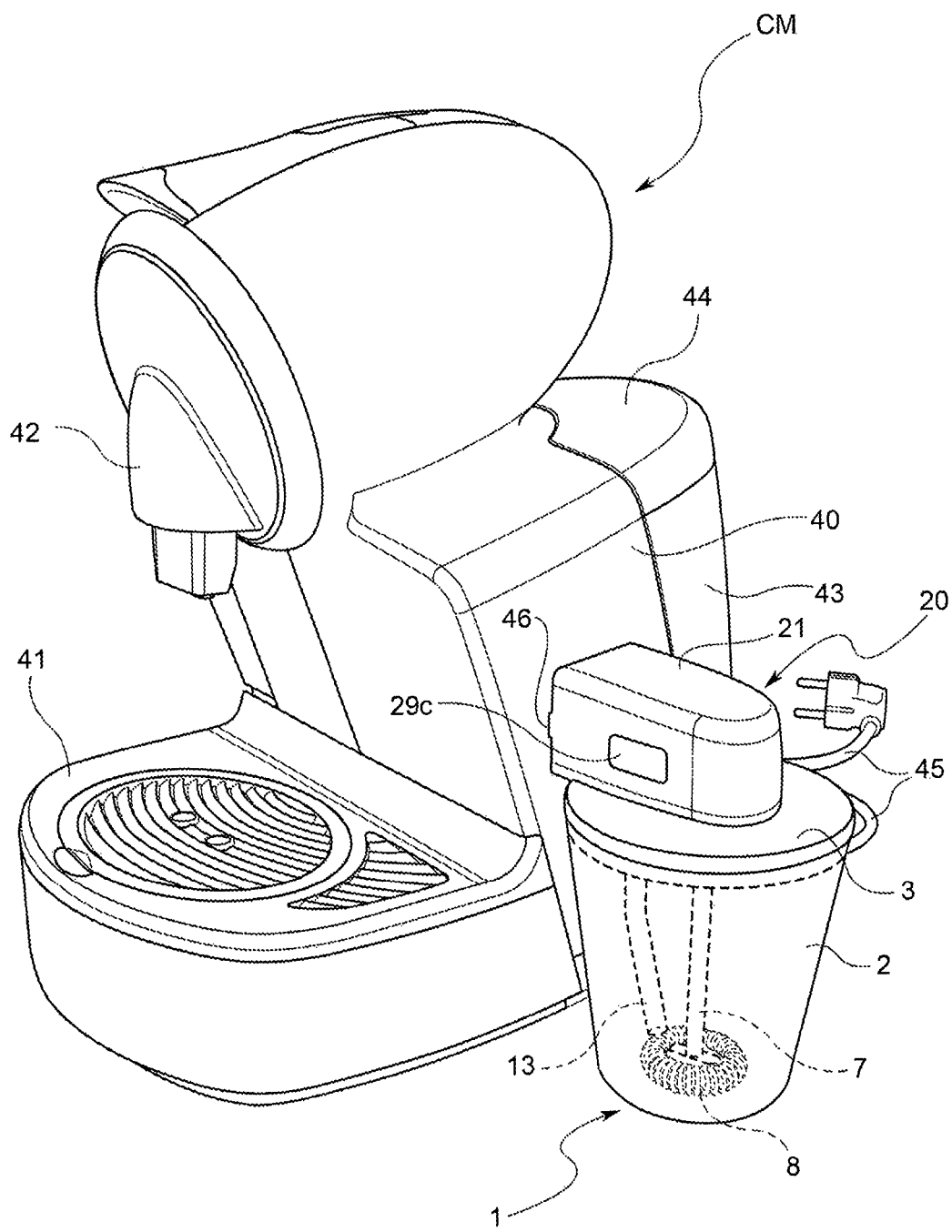
FIG. 1 is a perspective view of a coffee machine having, connected thereto, an apparatus for the preparation of beverages according to the present invention.
Figures 2, 3:
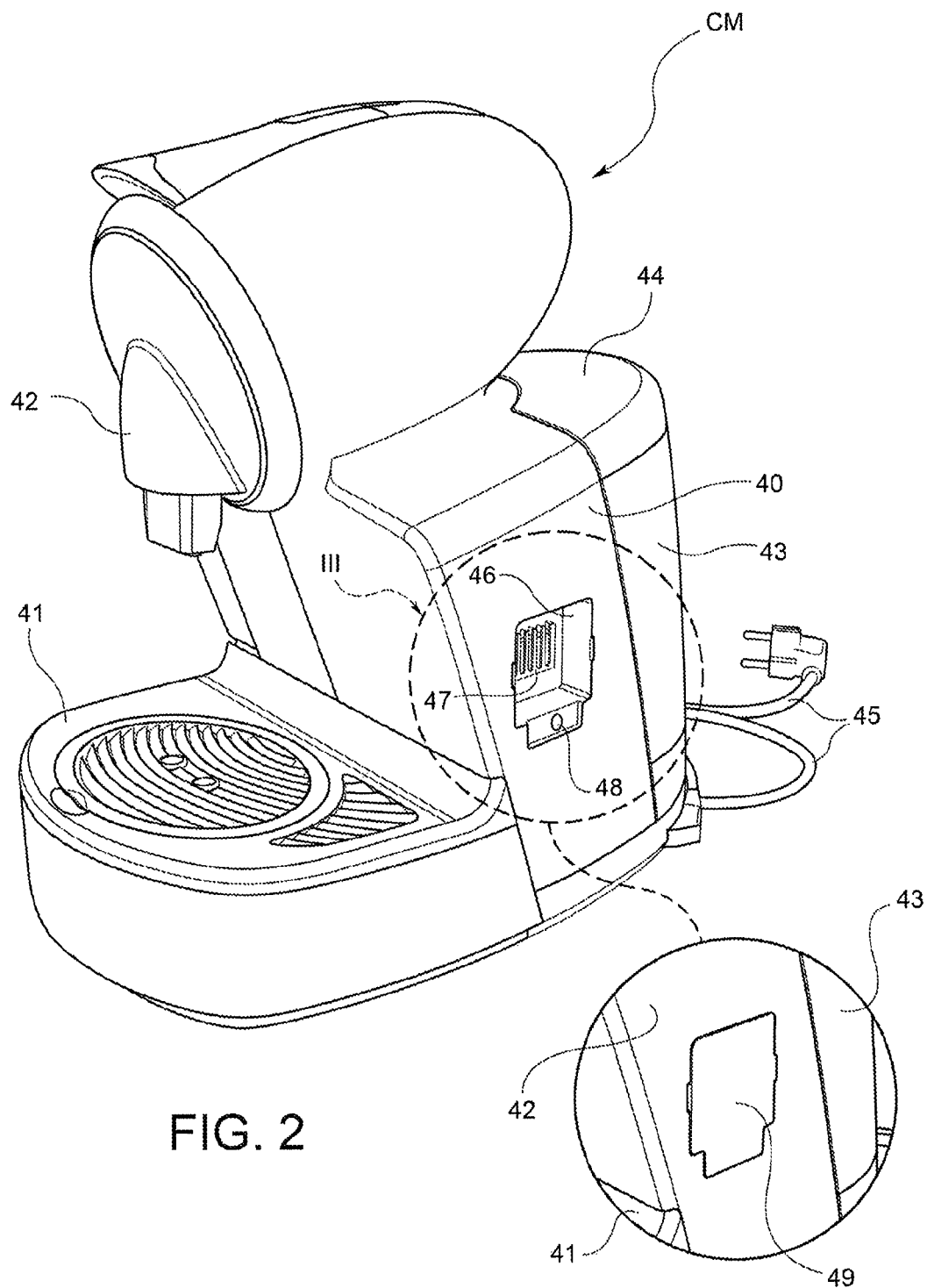
FIG. 2 is a perspective view of the machine according to FIG. 1, shown in the condition disconnected from the accessory apparatus for the preparation of beverages.
FIG. 3 shows, on a larger scale, a detail indicated by III in FIG. 2, with the addition of a closing cover.

In FIGS. 1 to 3, CM denotes overall an espresso coffee machine of the conventional type. Said machine has, connected to it, an accessory apparatus for the preparation of beverages according to the invention, denoted overall by 1.

In the example of embodiment shown in the drawings, the machine CM comprises a body 40 having a base 41 on which a container such as a cup or a glass is provided, and a dispensing head 42.

In the example shown, the machine CM also comprises a storage vessel 43 for the water used during preparation of the coffee, which is closed at the top by a cover 44.

In a manner known per se, for operation thereof, the machine CM can be connected by means of an electric cable 45 to a power supply socket of power supply network operating, for example, at 220 V AC.

With reference in particular to FIG. 2, in a first embodiment in a wall of the body 40 the machine CM has a seat 46, for example formed as a recess, inside which a multipolar electrical connector 47 is provided. This connector comprises at least one pair of terminals for supplying, during operation, electric power to the apparatus 1, as will be described more fully below.

The seat 46 of the machine CM is also provided with an outlet fluid socket 48 (FIG. 2), for example of the female type, connected to or able to be connected inside the machine to a hot steam source with which the latter is provided in a manner known per se.

As shown in FIG. 3, the seat 46 may have conveniently associated with it a removable closing cover 49, which can for example be snap-engaged with the inlet opening of this seat.

The apparatus 1 comprises a container 2 with an essentially frustoconical shape having a longitudinal axis A (FIG. 8) which, during use, is substantially vertical.

The container 2 has a removable cover 3 which is designed to close its inlet mouth.

Figure 7:
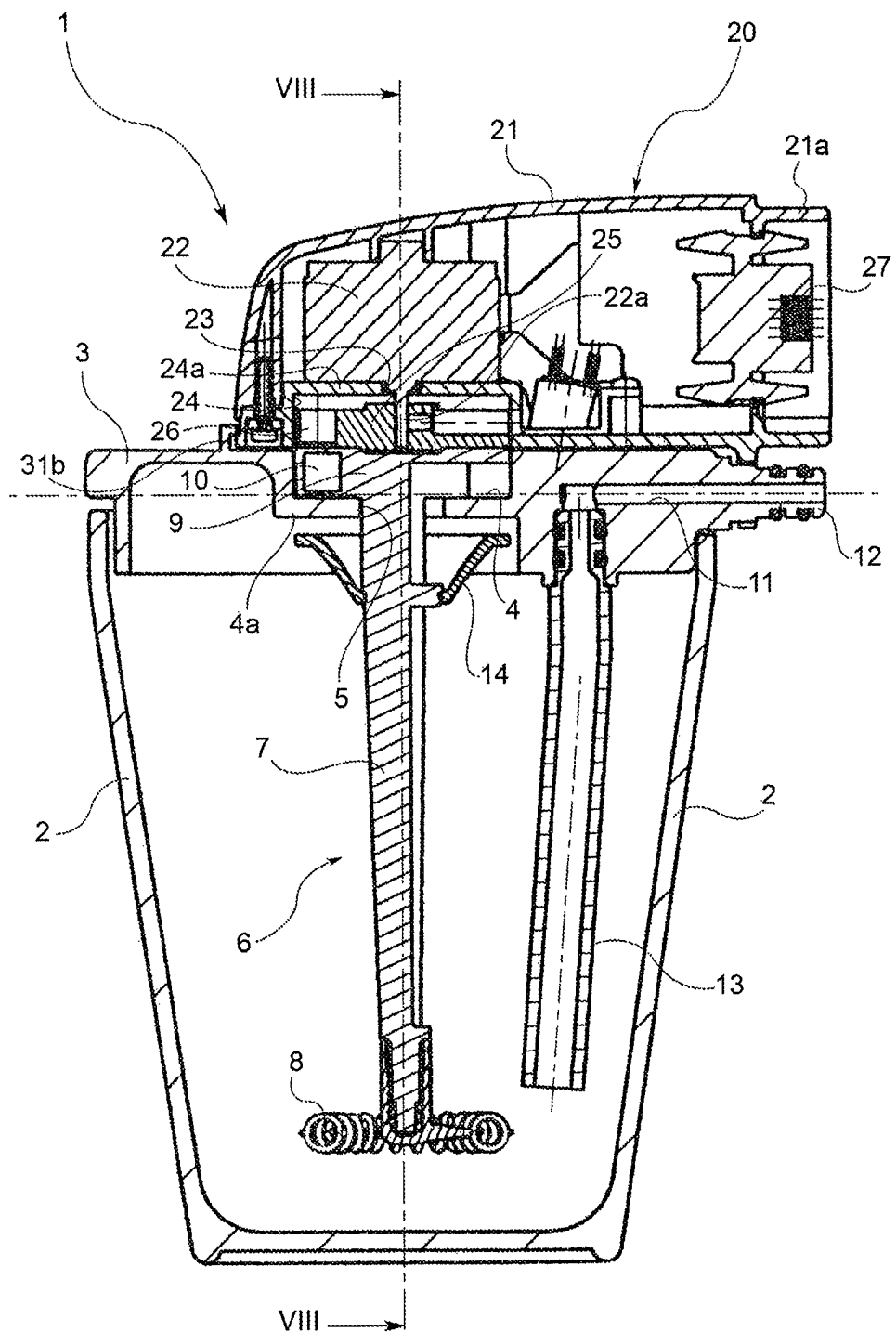
FIG. 7 is a cross-sectional view along the line VII-VII of FIG. 6.
Figure 8:
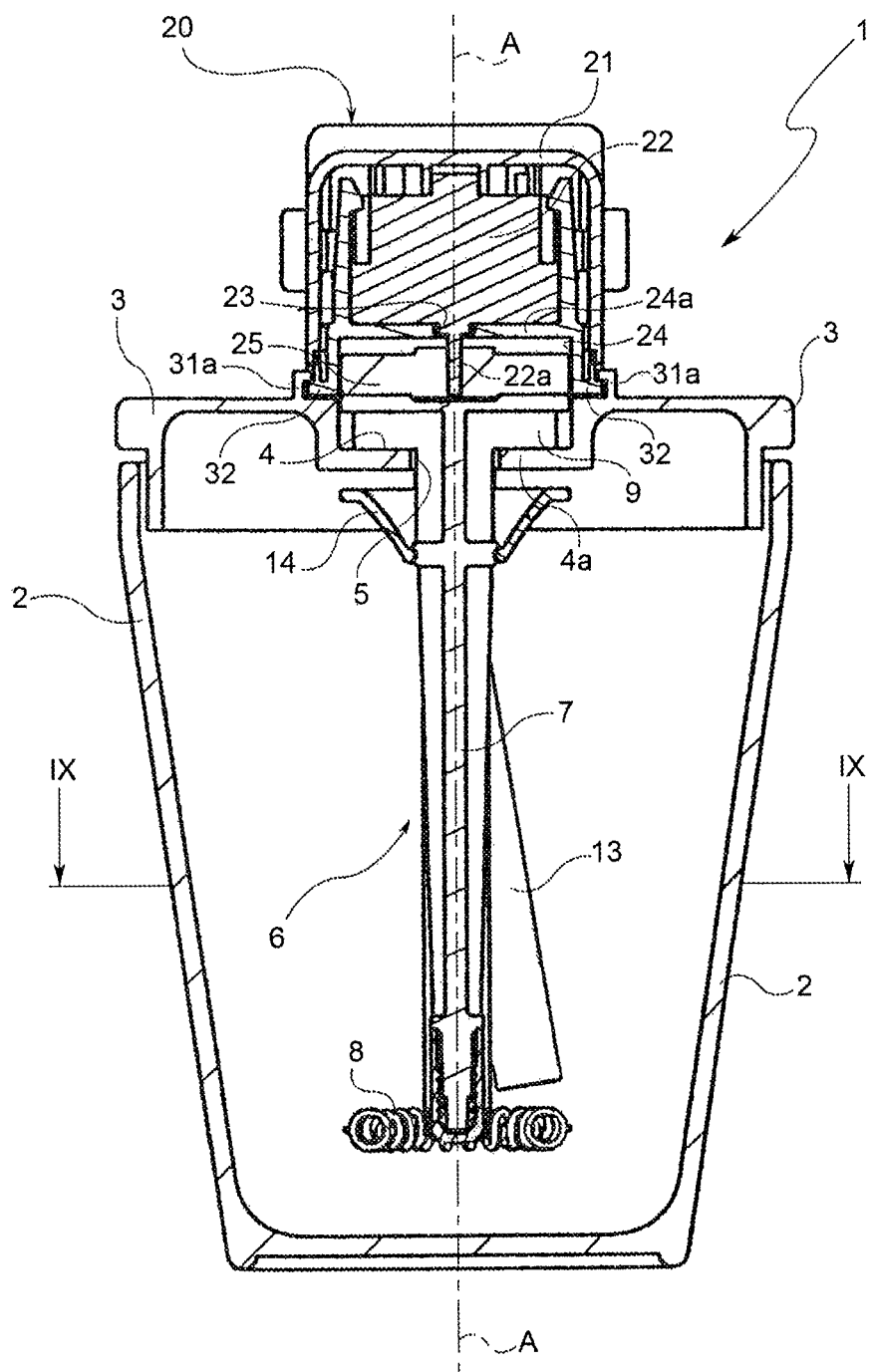
FIG. 8 is a cross-sectional view along the line VIII-VIII of FIG. 7.

This cover has a central recess 4, the bottom wall 4a of which is provided with an opening 5 (see in particular FIGS. 7 and 8). A mechanical stirring device 6, comprising a shaped stem 7, provided at the bottom with an end impeller 8, extends with radial play through the opening 5.

A wheel-like structure 9, incorporating a plurality of permanent magnets 10, only one of which is visible in FIG. 7, is integrally formed at the top end of the stem 7 of the stirring device. In the example shown, the structure 9 supports three permanent magnets 10 which are equally spaced angularly at 120° from each other.

The structure 9 is conveniently made as one piece together with the stem 7, for example from a moulded plastic material, and extends inside the recess 4 of the cover 3.

In the embodiment shown, the cover 3 has, formed therein, a channel 11 which extends essentially along an L-shaped path (FIG. 7). When the cover 3 is connected to the container 2, one end of the channel 11 emerges inside said container. The other end of the channel 11 extends through a fluid inlet union, of the male type, denoted by 12 in FIGS. 5 and 7. This union 12 is provided with one or more sealing O-rings and can be engaged inside the outlet socket 48 of the coffee machine CM.

Figure 9:
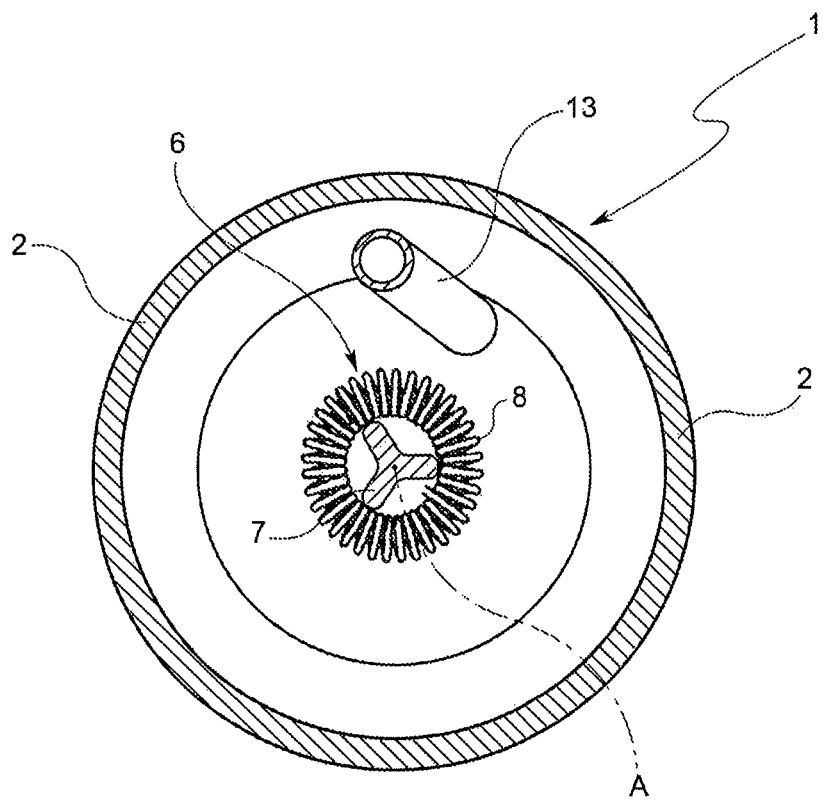
FIG. 9 is a cross-sectional view along the line IX-IX of FIG. 8.

A hot steam dispensing wand 13 is engaged inside the end of the channel 11, directed towards the inside of the container 2 (see FIGS. 7 to 9).

As can be seen in FIG. 7, the wand 13 extends inside the container 2 and is inclined towards the axis thereof. Moreover, as can be seen by viewing FIG. 8, the wand 13 is also preferably inclined in the direction of rotation of the stirrer 6 and more specifically of the impeller 8. In other words, the wand 13 is inclined both radially towards the axis A of the container 2 and in a circumferential direction in the direction of rotation of the stirring device 6.

By way of example, but not necessarily, the inclination of the wand 13 with respect to the axis A is equal to about 5-15° and preferably between 7 and 10°, while the inclination of this wand 13 in the circumferential direction is for example between about 5° and about 50°.

As can be seen in FIGS. 7 and 8, the top end of the stem 7 of the stirring device 6 is conveniently provided with a protection element 14 which in the example of embodiment shown has an essentially frustoconical form. This protection element faces the opening 5 of the recess 4 in the cover 3 and is radially broader than this opening.

In the embodiment shown by way of example the apparatus 1 also comprises a drive module denoted overall by 20. This module comprises a housing 21, for example made of moulded plastic, containing an electric motor 22 (FIGS. 7 and 8). As can be seen in FIG. 7, the motor 22 in the embodiment shown has a shaft 22a which extends outside the housing 21 through an opening 23 formed in the bottom wall 24a of a recess 24 defined in the bottom face of the housing 21 (see also FIG. 8).

Inside the recess 24, a wheel-like element 25 incorporating a plurality of permanent magnets 26, only one of which is visible in FIG. 7, is keyed onto the shaft 22a of the electric motor 22. In the embodiment shown by way of example the position and the number of magnets 26 of the element 25 correspond to those of the permanent magnets 10 of the element 9 of the stirring device 6.

Figure 5:
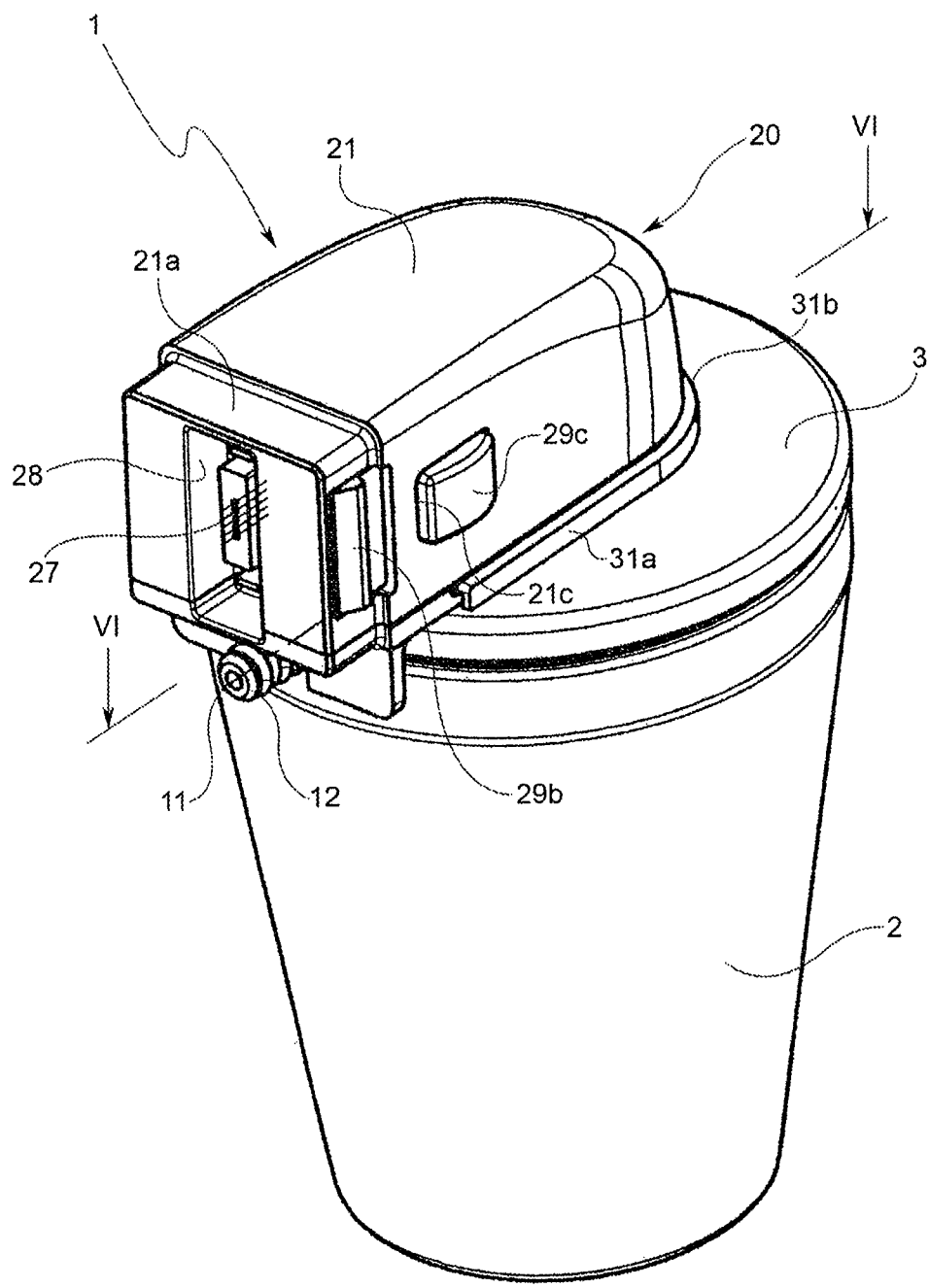
FIG. 5 is a perspective view of an apparatus for the preparation of beverages according to the invention.

As can be seen in particular in FIGS. 5 and 7, in a side wall the housing 21 has a multipolar electrical connector 27 which can be connected to the connector 47 of the coffee machine CM.

The electrical connector 27 is formed in particular in a recess 28 provided in an end portion 21a of the housing 21 (FIGS. 5 and 7) having a tapered cross-section, so that it can be engaged inside the main top part of the seat or recess 46 of the coffee machine CM.

Figure 6:
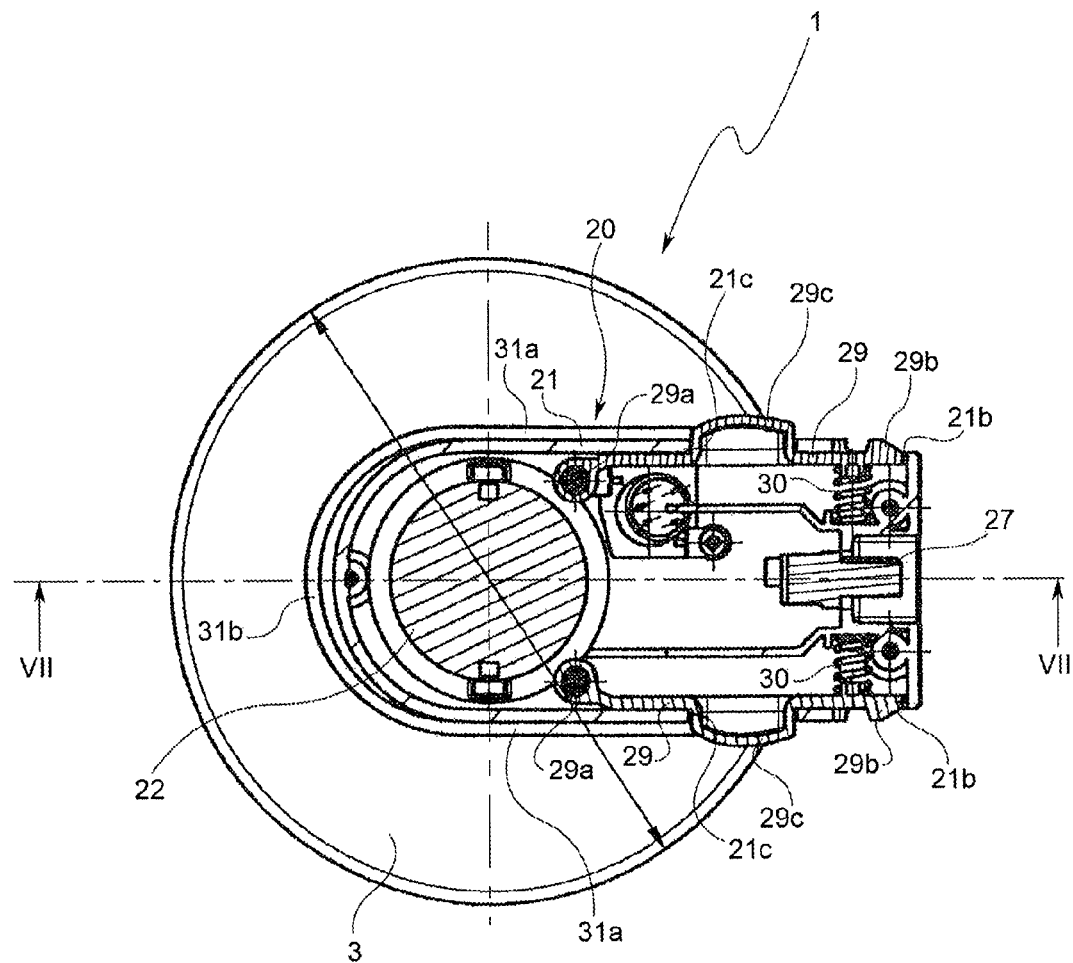
FIG. 6 is a partial cross-sectional view along the line VI-VI of FIG. 5.

As can be seen in FIGS. 5 and 6, the housing 21 has two arms 29 which are pivotably mounted about respective axes or fulcrums 29a parallel to each other. On the opposite side to these fulcrums the arms 29 have respective ends 29b which protrude outside of the housing 21 through corresponding openings 21b in the latter (see in particular FIGS. 5 and 6).

The housing 21 has internally respective springs 30 (FIG. 6) which are associated with the arms 29 and tend to splay their ends 29b. The latter are shaped, viewed in cross-section (FIG. 6), substantially in the manner of wedge-shaped teeth and are able to snap-engage inside corresponding lateral retaining recesses provided in the seat or recess 46 of the coffee machine CM when the module 20 is engaged with its portion 21a inside said seat 46.

The arms 29 have respective intermediate portions 29c (FIGS. 5 and 6) protruding outside of the housing 21 through corresponding openings 21c thereof. These intermediate portions 29c may be pressed manually, towards each other, against the action of the springs 30 when it is required to disengage the module 20 from the seat 46 of the coffee machine CM.

Inside the housing 21 the terminals of the multipolar electrical connector 27 are connected, in a manner not shown, to the power supply terminals of the electric motor 22 and, where applicable, to one or more electric sensors contained inside said housing (for example a temperature sensor).

The housing 21 of the module 20 and the cover can be coupled together in the manner which will now be described by way of example.

Figure 4:
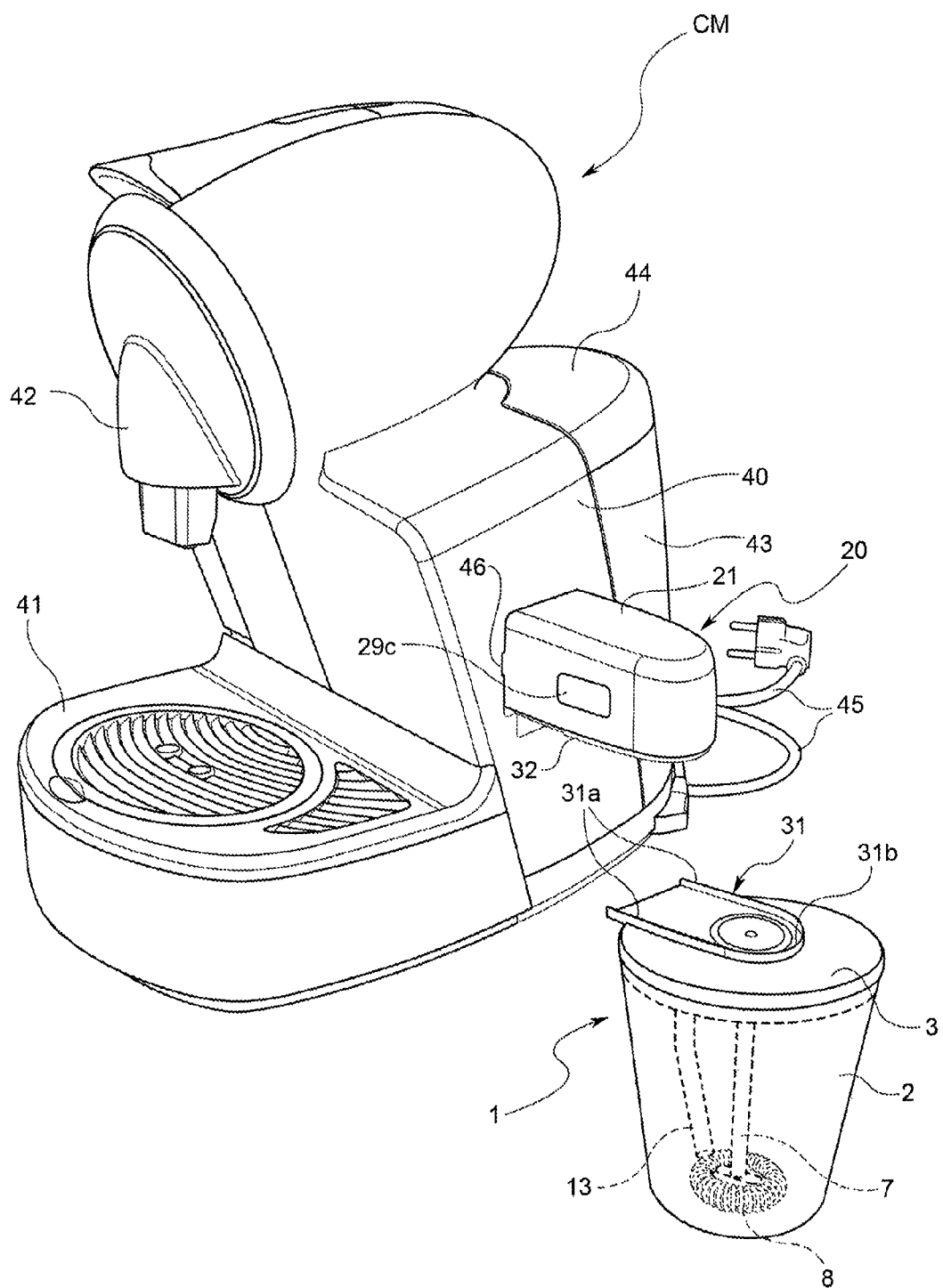
FIG. 4 is a perspective view similar to that shown in FIG. 1 and shows a condition in which the container and the cover of the apparatus according the invention are disconnected from the associated coffee machine.

With reference to FIGS. 4, 5 and 8, the top surface of the cover 3 has, formed therein, a retaining and guide structure which has an essentially U-shaped configuration in plan view, with two straight and parallel arms 31a which are connected together by an intermediate curved portion 31b which extends around the mouth of the recess 4 in the cover 3. The structure 31 has, viewed in cross-section, a shape substantially in the form of an overturned L.

Correspondingly, along the perimeter of its bottom face, the housing 21 of the drive module 20 has a corresponding structure 32 with an essentially U-like general shape, the cross-section of which is in the form of an L, with the "short" sides directed towards the outside (see in particular FIG. 8).

The arrangement is such that the structure 32 of the drive module 20 can be engaged slidably inside the retaining and guide structure 31 of the cover 3. FIG. 5 or 8 show the drive module 20 in the condition engaged on the cover 3. As can be seen in particular in FIGS. 7 and 8, in this condition the wheel-shaped elements 9 and 23, which are mounted on the stirring device 6 and the shaft of the electric motor 22, respectively, are situated facing and next to each other. The arrangement is such that, when said engagement is performed, an attraction of such an intensity occurs between the magnets 29 and 10 (FIG. 7) that the stirring device 6 is in fact locked torsionally together with the element 23 and the shaft of the electric motor 22.

In the condition where the drive module 20 is coupled together with the cover 3, the fluid inlet union 12 of the latter is essentially aligned and parallel and directed on the same side as the multipolar connector 27 of the module 20, as can be seen in particular in FIGS. 5 and 7.

The drive module 20 and the unit formed by the container 2 and by the cover 3 are able to be coupled, singly and together, with the seat 46 of the coffee machine CM.

FIG. 1 shows the operating condition of the apparatus 1 for the preparation of a beverage in which both the drive module 20 and the unit formed by the container 2 and the associated cover 3 are engaged inside the opening or seat 46 of the machine CM.

FIG. 4 shows moreover a condition in which the drive module 20 is left engaged inside the seat 46 of the coffee machine CM, while the unit formed by the container 2 and by the cover 3 has been disengaged and separated from it.

FIG. 5 shows instead a condition in which the drive module 20 and the unit formed by the container 2 and by the associated cover 3 are coupled together.

Figure 10:
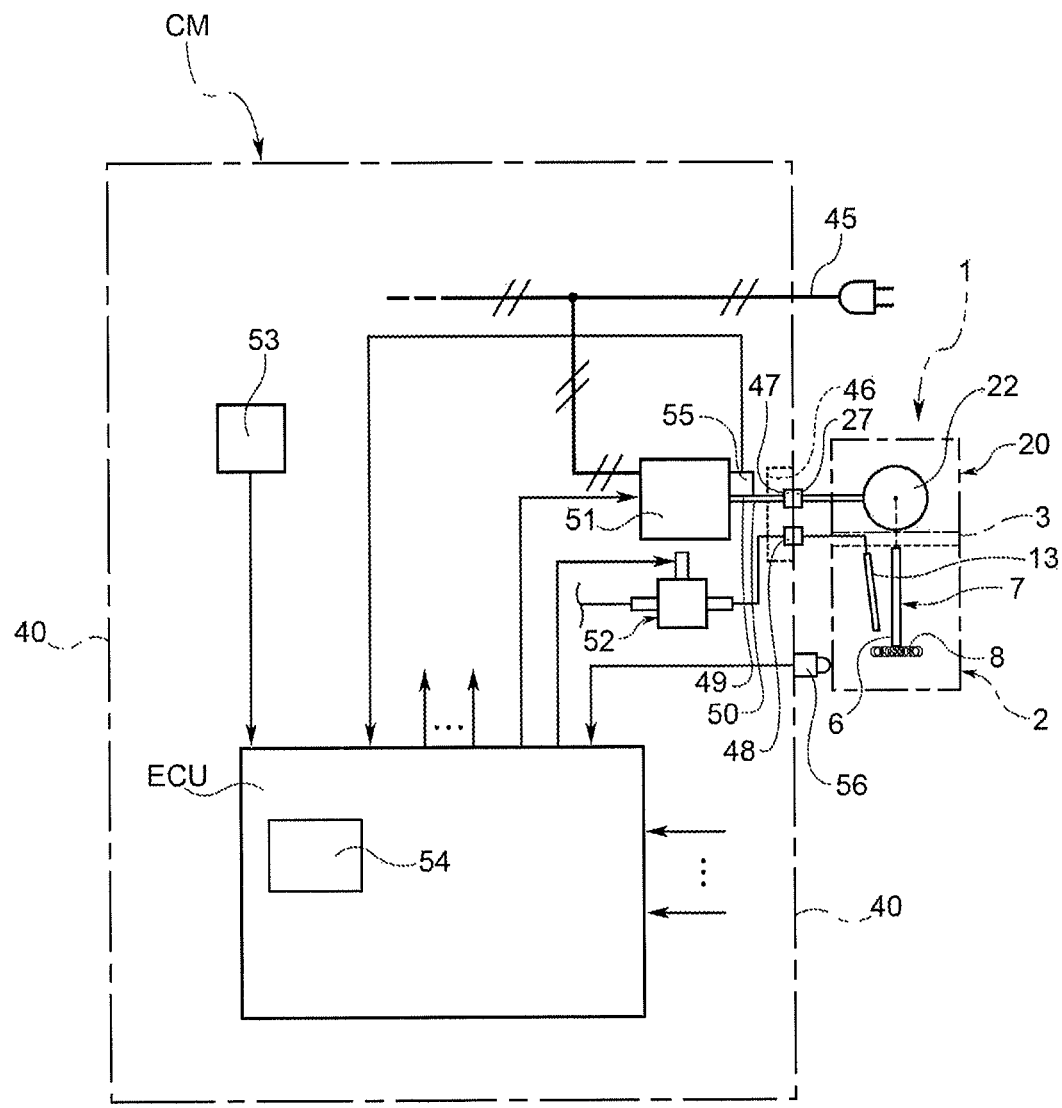
FIG. 10 is an electrical block diagram of a system for the preparation of beverages according to the present invention.

With reference to FIGS. 1 and 10, when the apparatus 1 in its entirety is coupled to the coffee machine CM, the electric connector of the apparatus is connected to the connector 47 of the machine CM, and the fluid inlet union 12 of the cover 3 is coupled to the outlet socket 48 of said machine.

Inside the machine CM the connector 47 thereof is connected to the terminals 49 and 50 supplying power (dc or ac voltage). These terminals may constitute for example the output terminals of a voltage supplier 51 controlled by an electronic unit ECU of the machine. In the embodiment shown by way of example in FIG. 10 the voltage supplier 51 is supplied in turn with the voltage supplied by the mains to which the power supply cable 45 is connected.

In the condition where the apparatus 1 is connected to the machine CM, the steam dispensing wand 13 is connected to the output of a steam source inside the machine CM, for example via a solenoid valve controlling the steam supply, denoted by 52 in FIG. 10. This solenoid valve 52 is also driven by the electronic control unit EC of the machine CM.

If one or more electric sensors are associated with the drive module 20, they may be connected to corresponding inputs of the unit ECU of the machine CM via the connectors 27 and 47.

The unit ECU also has, connected thereto, a manual control and operating device, denoted by 53 in FIG. 10, by means of which the user may set and activate operation of the accessory apparatus connected to the machine CM.

The unit ECU is also provided with memory devices 54, the function of which will be described more fully below.

During use, in order to prepare a hot beverage, a liquid (for example milk) is poured into the container 2, following which it is closed by the cover 3. The drive module 20 is then coupled to this cover, and the device 1 as a whole is then connected to the coffee machine CM.

The user, via the device 53 (FIG. 10), sets the type of beverage required and activates preparation thereof. The control unit ECU then deduces, depending on the type of beverage set by the user, the operating parameters for preparation thereof, in particular the time and speed of rotation of the electric motor 20 and the duration of the supply of hot steam through the wand 13.

The unit ECU therefore manages preparation of the beverage on the basis of the operating parameters thus defined.

Once preparation has been completed, the user may remove the unit formed by the container 2 and the cover 3 from the machine CM. After removing the cover 3, the user may use the liquid heated and frothed inside the container 2, if necessary with the addition of further components such as a quantity of coffee prepared, before or after, with the machine CM, so as to obtain the desired final beverage.

The container 2 and the cover 3 may then be washed. It is instead not necessary to wash the drive module 20.

The system described above may advantageously be equipped with safety devices. For example, the coffee machine CM may be provided with a detection device 55 (FIG. 10) designed to provide the control unit ECU with signals indicating the amount of power used by the motor 22 of the apparatus 1. The control unit ECU may be set to operate, whenever the user activates the apparatus 1, the motor 22 for a fraction of a second sufficient to allow the detection of the power used by said motor. The amount of power thus detected is compared by the unit ECU with a threshold value: said unit is thus able to establish whether the unit formed by the container 2 and the cover 3 is actually connected to the drive module 20 (and therefore whether the impeller 6 is connected to the motor 22) and prevent activation of the drive module 20 and dispensing of very hot steam in the absence of the container 2.

The actual presence of the container 2 may, alternatively or additionally, be detected by the control unit ECU via a special presence sensor 56 (FIG. 10), such as a microswitch.

By comparing the detected amount of power used by the motor 22 with a different threshold value, the control unit ECU is able to determine not only whether the unit formed by the container 2 and the cover 3 is actually connected to the drive module 20, but also whether a liquid is present inside the container 2. In this case, in fact, the resistance torque which the electric motor 22 must overcome is greater and the amount of power which it uses is correspondingly higher.

Figure 11:
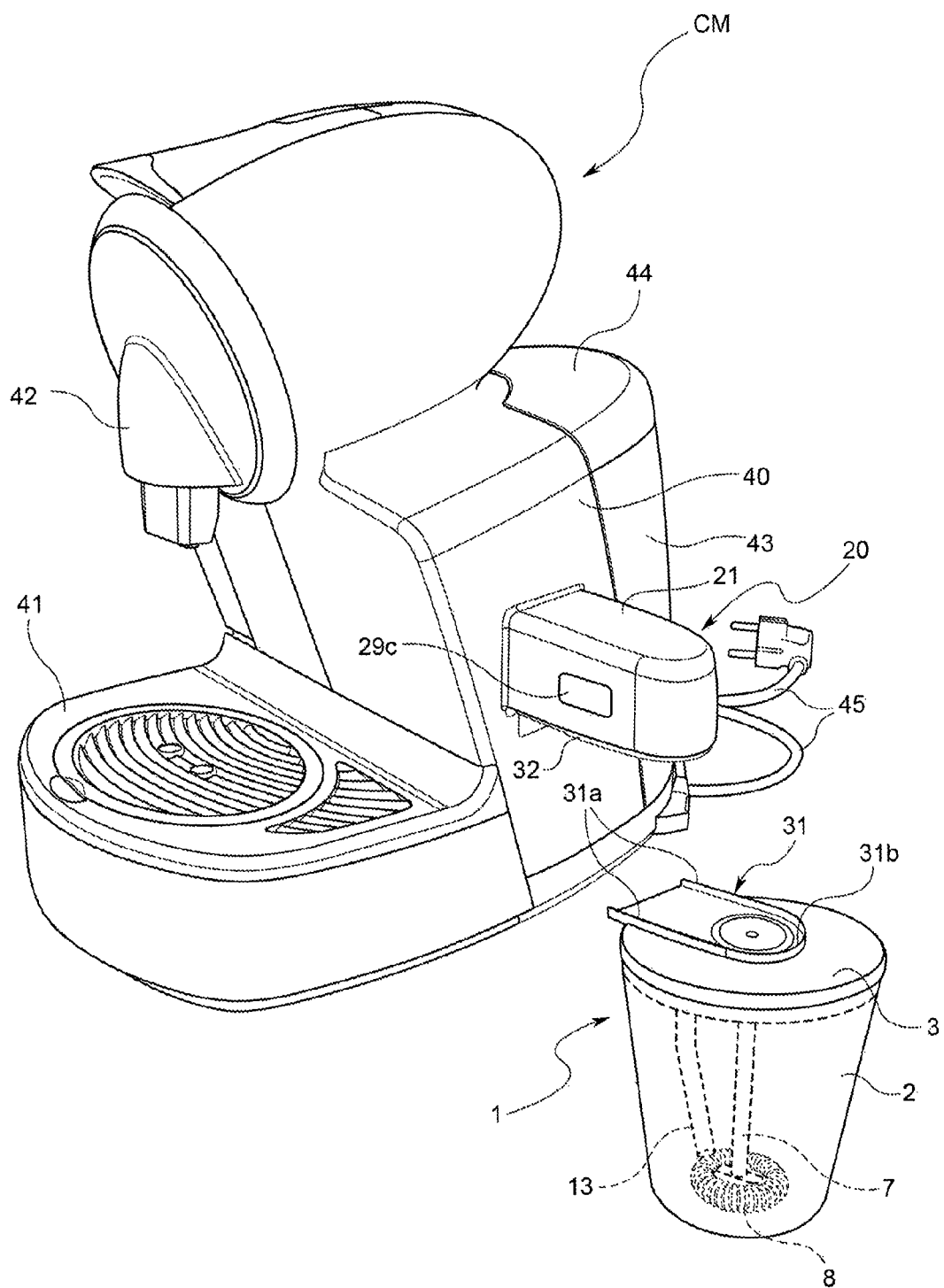
FIG. 11 shows a variation of embodiment.

In an embodiment shown in FIG. 11, the drive module 20 is designed so as to be integrated in the machine CM such that its electric motor 22 is permanently connected to the internal circuits of said machine. The housing 21 may therefore form an integral part of the body 40 of the machine CM. In this embodiment the unit formed by the container 2 and the cover 3 may, as described above, be coupled with and uncoupled from the drive unit 20, in the coupled condition its inlet fluid union 12 being connected to the fluid outlet socket 48 of the machine CM.

In other respects, in this case also, the constructional details and the operating modes correspond essentially to that described further above.

Obviously, without affecting the principle of the invention, the embodiments and the constructional details may be significantly varied with respect to that described and illustrated purely by way of a non-limiting example, without thereby departing from the scope of the invention as defined in the accompanying claims.

The invention claimed is:

1. A system for the preparation of milk-based beverages, comprising:
    a coffee-making machine (CM) provided with a steam dispensing socket (48) connected or able to be connected to an internal steam source (52) of the machine (CM), and
    an accessory apparatus (1) comprising:
    a container (2),
    a removable cover (3), suitable for closing the container (2),
    a rotatable stirrer (6) which extends inside the container (2) and is provided with an end impeller (8),
    an electric motor (22), configured for driving the stirrer (6) rotationally via a coupling joint (9, 10, 23, 26), and
    a hot steam dispensing wand (13), also extending inside the container (2) and connectable to the steam source (52) of said machine (CM) via a fluid connection union (12) associated with the cover (3);
    wherein:
        the electric motor (22) is contained in a housing (21), which is separate and distinct from the cover (3), and is connected or able to be connected to power supply associated;
        the cover (3) is configured to support the stirrer (6) rotationally and the fluid connection unit (12) thereof is able to be directly connected to the steam dispensing socket (48) of the coffee-making machine (CM);
        the coupling joint comprising first and second pluralities of permanent magnets (10; 26) which are separate and distinct from each other and are connected to a shaft of the motor (22) and to an end of the stirrer (6) opposite the impeller (8) and close to the cover (3), respectively;
        the housing (21) and the cover (3) being configured to be coupled together in an operating configuration in which said first and second pluralities of permanent magnets (10; 26) allow transmission of the rotation from the motor (22) to the stirrer (6) and in which the inlet fluid union (12) of the cover (3) can be directly connected to the steam dispensing socket (48) of the machine (CM),
        the coffee-making machine (CM) is provided with a sensor (56) for detecting whether the assembly formed by the container (2) and the cover (3) of the apparatus (1) is connected to said electric motor (22), and
        wherein said the preparation system further comprises an electronic control unit (ECU) for detecting an amount of power used by said electric motor (22) during a period of preliminary activation thereof and comparing the amount of power thus recorded with at least one predetermined threshold value.

2. The system according to claim 1, wherein the electric motor (22) is contained in the housing (21) which is separate and distinct from the machine (CM) and is provided with an electric connector (27) able to be connected directly to an electric socket (47) of the coffee-making machine (CM) with which the apparatus (1) is associated.

3. The system according to claim 2, wherein said housing (21) is provided with snap-engagement arms (29b) able to be engaged detachably with a seat (46) provided in the coffee-making machine (CM) with which the apparatus (1) is associated.

4. The system according to claim 1, wherein the electric motor (22) is contained in the housing (21) which is integrated in the coffee-making machine (CM) with which the apparatus (1) is associated.

5. The system according to claim 1, wherein the cover (3) of the container (2) and the housing (21) have corresponding structures (31, 32) for mutual engagement, which can be detachably engaged with each other.

6. The system according to claim 1, wherein the coffee-making machine (CM) comprises a setting device (53) which can be used by a user to set a type of beverage and activate preparation of the beverage and is connected to the electronic control unit (ECU) of the machine (CM), which is designed to modify the duration and a speed of rotation of the motor (22) and/or a duration of the supply of hot steam inside said container (2), depending on the type of beverage set by the user.

* * * * *